J. LEWIS.
Car Spring.
No. 4,965. Patented Feb. 10, 1847.
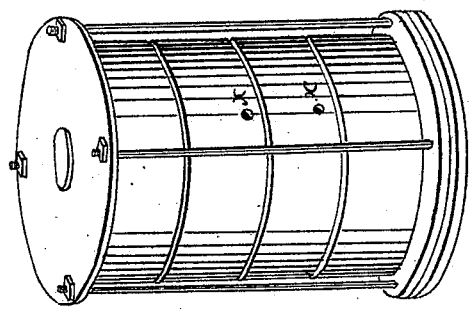
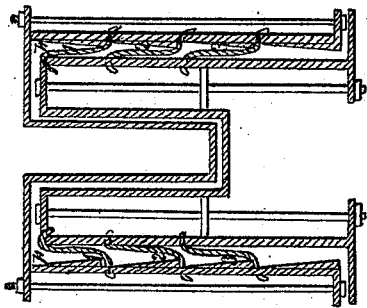
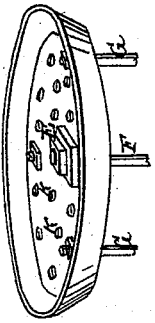
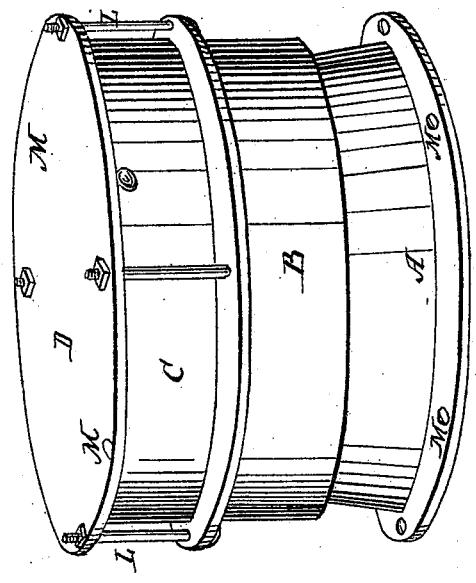
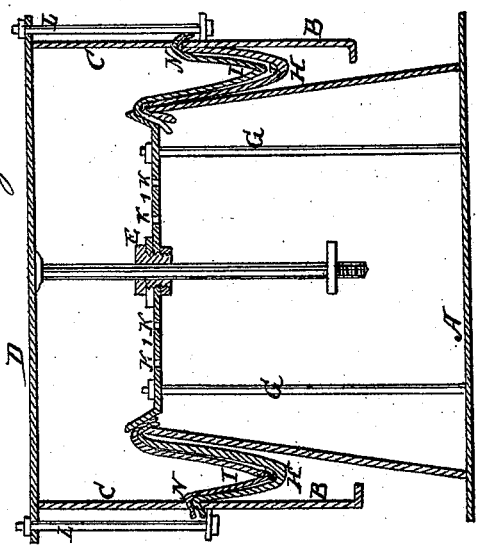

UNITED STATES PATENT OFFICE.

JNO. LEWIS, OF NEW HAVEN, CONNECTICUT, ASSIGNOR TO EZRA C. REED AND BENJ. M. SHERMAN.

PNEUMATIC SPRING.

Specification of Letters Patent No. 4,965, dated February 10, 1847.

*To all whom it may concern:*

Be it known that I, JOHN LEWIS, of the city and county of New Haven and State of Connecticut, have invented a new and useful Improvement in Pneumatic Springs for Railroad-Cars, Locomotives, Burden-Cars, Bumpers, &c., and which is also Applicable as a Hydraulic Press, and that the following is a full, clear, and exact description of the principle or character which distinguishes it from all other things before known and of the manner of making, constructing, and using the same, reference being had to the accompanying drawings, making part of this specification, in which—

Figure 1 is a perspective representation of one of the springs; Fig. 2, a vertical section of the same; Fig. 3, a perspective representation of a separate part; Fig. 4, a perspective representation of a hydraulic press, and Fig. 5, a vertical section of the same.

The same letters indicate like parts in all the figures.

The perfect elasticity of atmospheric air has long since suggested the idea of applying it as a substitute for metal springs in machinery requiring the interposition of elastic media; but so far as I have been able to ascertain, this has always been effected by means of a metallic cylinder and piston, or by spherical or other formed vessels of gum elastic, or other elastic substance impervious to air, the former of which is objectionable because of the difficulty of retaining the air in the vessel under the heavy pressure required for such springs, the unequal expansion of the metal causing the surface of the piston and cylinder to wear and permit the escape of the contained air— and the latter because of the difficulty of obtaining the requisite strength and amount of play, and also the difficulty of so connecting the parts as to regulate the movements thereof.

The nature of my invention consists in applying the elasticity of atmospheric air or any permanently elastic gas by means of air expanding and contracting chamber or chambers, made in one, two, or more parts and connected together by means of two or more belts of india rubber cloth or other flexible or impermeable material with alcohol or other liquid interposed, the more effectually to prevent the escape of the air or gas contained in the apparatus, and to aid in relieving the flexible connection and preventing its rupture by the action of the weight or force on the spring. This mode of connecting two vessels being applicable without the air to other purposes such as hydrostatic presses, &c., by forcing water into or between the two vessels. And my improvement also consists in providing this apparatus with one or more of what I denominate a respiratory chamber or chambers attached to one or both ends of the apparatus and separated from the main chamber of the apparatus by a diaphragm or diaphragms perforated with holes which will check the passage of the air and thus relieve the apparatus from the injurious effects of sudden shocks.

The manner in which I prefer to construct this apparatus is represented in the accompanying drawings, in which (A) is a metallic conical vessel with a plate or disk at bottom. The upper edge of this vessel is beveled inwards around its circumference to receive the edge of the belts (H) and (I) which are there secured by a plate (P) which has a conical flanch (P), so that when the plate (P) is drawn toward the bottom plate by three or more bolts (G), the belts are gripped and firmly held between the beveled edge of the vessel and the conical flanch. The other edge of the belts (H, I) are connected with and held by the parts of a cylindrical vessel (D) which surrounds the vessel (A) leaving space enough between the two for the working of the belts which by the pressure of the contained air are alternately pressed against and sustained by the inner periphery of the cylindrical vessel and the outer periphery of the conical vessel. The belts are secured in the vessel (D) by making its cylindrical part in two (B) and (C). The edges of these two parts, when they come together are beveled to receive the edge of the belts which are there gripped and firmly held by drawing the two parts (B) and (C) together by means of screw bolts (L) that pass through the head of the vessel (D) and a flanch on the part (B). The connecting belts (H, I) are flexible hoops of india rubber or other flexible substance impermeable to air, and the edges being firmly held the space (J) between the two is filled with alcohol or other liquid which not only prevents all possibility of air passing through but brings an equal pressure on both belts and equalizes the pressure on all parts to prevent rupture.

The connection of the two vessels (A) and (D) by means of the belt divides the apparatus into two parts or chambers (A') and (D'), the plate or diaphragm (P) being the division, and this is perforated with numerous small holes (k) to break the passage of air as the chamber (D') is enlarged or contracted by the movement of the two vessels on each other. I therefore term this perforated plate the "respirator" as it permits the passage of air from one chamber to the other and at the same time checks its too sudden passage and therefore avoids to a certain extent all sudden jars in cars or other bodies having such springs interposed. The motion of the two vessels on each other it guided by a rod (E) attached to the head of the vessel (D) which passes through a guide hole or stuffing box (E') in the respirator (P). Or, instead of this the rod (E) may play in a tube extending from the bottom of the vessel (A) up through the respirator (P). Or, guide rods may be applied outside. The vessel (A) instead of being conical may be made cylindrical; but the two vessels must be so formed as to present alternately a supporting surface to the belt, which in consequence of the pressure of the air in the chamber (D') rolls gradually from one surface to the other, and is therefore at all times supported by either one or both of these surfaces.

Instead of one respirator or perforated diaphragm two or more may be employed the more effectually to ease off the passage of the air as it is compressed or expanded; and this respirator may be of any desired form and may be located in any part of the two chambers. Instead of the double belt above described connected together at the edges I contemplate placing two or more single belts separated from each other as represented in Fig. 5, with the liquid in the spaces (J, J), holes (s, s) being made through the outer casing for the introduction of the liquid.

When I use this apparatus as a hydrostatic press I make it as represented in Figs. 4 and 5, and force the water into the chamber (D') by any of the known means, which forces apart the two vessels (A) and (D) in the same manner as in the cylinder and piston press except that the friction of the moving parts is avoided. Air is to be forced into the chambers when the apparatus is used as a spring by any of the known means. It will be obvious that the form of the various parts of this apparatus can be varied at pleasure so long as the principle or mode of operation above pointed out is retained.

I deem it important and an essential improvement to make either the inner or the outer vessel conical so that the space between the two vessels shall gradually decrease as the pressure in the vessels increases so that the curved portion of the belt or belts between them shall be decreased the better to resist the increased pressure.

What I claim as my invention and desire to secure by Letters Patent, is—

1. The method of connecting the two vessels composing the pneumatic spring, bumper, press, &c., by means of two or more belts with alcohol or other liquid interposed, substantially as described, to be used for the purposes above set forth.

2. I claim so arranging the two vessels and the connecting belt or belts, substantially as described, that the belt or belts shall, at all times, be sustained by either one or both of the vessels, to prevent them from being ruptured by the pressure of the contained fluid, as described.

3. I claim dividing the space between two disks into one or more spaces by means of a perforated diaphragm or diaphragms to form what I denominate a "respiratory chamber" (or chambers), substantially as described, and for the purposes explained above.

4. I also claim making the inner periphery of the outer vessel or the outer periphery of the inner vessel, or both, beveled or conical, so that the space between the two in which the flexure of the connecting belt or belts takes place, shall be diminished as the pressure increases, as described, for the purpose of enabling the flexible connection the better to resist the increased pressure, as described; and this I claim whether used with or without the other improvements.

JOHN LEWIS.

Witnesses:
CHAS. M. KELLER,
A. B. WOOD,